(12) United States Patent
Carl et al.

(10) Patent No.: US 11,919,372 B2
(45) Date of Patent: Mar. 5, 2024

(54) MODULE ASSEMBLY FOR A VEHICLE HAVING SEALING COMPONENT FOR A SILL REGION OF A WINDOW OPENING

(71) Applicant: Brose Fahrzeugteile SE & Co. Kommanditgesellschaft, Bamberg, Bamberg (DE)

(72) Inventors: Andre Carl, Coburg (DE); Dominik Hofmann, Baunach (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 703 days.

(21) Appl. No.: 17/044,930

(22) PCT Filed: Apr. 1, 2019

(86) PCT No.: PCT/EP2019/058126
§ 371 (c)(1),
(2) Date: Oct. 2, 2020

(87) PCT Pub. No.: WO2019/192945
PCT Pub. Date: Oct. 10, 2019

(65) Prior Publication Data
US 2021/0162846 A1     Jun. 3, 2021

(30) Foreign Application Priority Data

Apr. 4, 2018   (DE) .................... 10 2018 205 074.0

(51) Int. Cl.
*B60J 10/00*     (2016.01)
*B60J 5/04*     (2006.01)
*B60J 10/75*     (2016.01)

(52) U.S. Cl.
CPC ............. *B60J 10/75* (2016.02); *B60J 5/0426* (2013.01)

(58) Field of Classification Search
CPC ...... B60J 7/0411; B60J 7/0412; B60J 7/0416; B60J 7/0426; B60J 10/75; B60J 5/0411; B60J 5/0412; B60J 5/0416; B60J 5/0426
USPC .................. 296/146.2, 146.5, 146.7, 49, 502
See application file for complete search history.

(56) References Cited

U.S. PATENT DOCUMENTS

| 2017/0282695 A1 | 10/2017 | Resch et al. |
| 2018/0072141 A1 | 3/2018 | Shimoda |

FOREIGN PATENT DOCUMENTS

| DE | 19648528 A1 | 5/1998 |
| DE | 10027283 A1 | 1/2002 |
| DE | 102015012667 A1 | 3/2017 |
| EP | 1911619 A2 | 4/2008 |
| WO | 9628314 A1 | 9/1996 |

*Primary Examiner* — Dennis H Pedder
(74) *Attorney, Agent, or Firm* — Dickinson Wright PLLC (57) ABSTRACT

A module assembly for a vehicle, including a shell construction, defining a window opening, and a module component fixed to the shell construction and forming a part of the sill flange extending along a longitudinal extension direction for attaching a seal in a sill region of the window opening, wherein at least one flange section of the shell construction extending along the longitudinal extension direction and/or at least one flange section of the module component extending along the longitudinal extension direction is provided for forming the sill flange. The flange section of the shell construction and/or the flange section of the module component has at least one contact region protruding transverse to the longitudinal extension direction.

20 Claims, 11 Drawing Sheets

MODULE ASSEMBLY FOR A VEHICLE HAVING SEALING COMPONENT FOR A SILL REGION OF A WINDOW OPENING

CROSS-REFERENCE TO RELATED APPLICATIONS

This application is the U.S. National Phase of PCT Application No. PCT/EP2019/058126 filed on Apr. 1, 2019, which claims priority to German Patent Application No. DE 10 2018 205 074.0, filed on Apr. 4, 2018, the disclosures of which are hereby incorporated in their entirety by reference herein.

TECHNICAL FIELD

The present disclosure relates to a vehicle door and window.

BACKGROUND

In principle it is known, for example, from the production of vehicle doors that a seal is positioned onto a sill flange which is formed by joining two shell components. In this case, generally a sill flange of uniform wall thickness, onto which a seal may be positioned in a simple manner, is produced after joining the two metal shell components. A sufficiently high sealing pressure by which the attached seal bears against the window pane to be adjusted, is provided in a simple manner here. Moreover, the stiffness of the sill flange is generally not critical due to the two assembled shell components. If a further component is intended to be used for forming the sill flange, difficulties may arise relative to the seal to be attached to the sill flange.

Thus, for example, it is known from practice to configure a part of the sill flange for a window opening on a vehicle door by a module component in the form of a door module. In this case, the shell construction defining a window opening forms a first part of a sill flange for attaching a seal in the sill region of the window opening. The module component in turn forms a second part of the sill flange, wherein at least one flange section of the shell construction and at least one flange section of the module component abut each other for forming the sill flange. In the case of such a module assembly with a shell construction and a module component fixed thereto, however, the problem potentially arises that the sill flange has different wall thicknesses along its width, whereby the seal may be negatively affected.

SUMMARY

One or more objects of the present disclosure may be to provide an improved module assembly comprising a shell construction defining a window opening and a module component which is fixed to the shell construction.

According to one or more embodiments, a module assembly for a vehicle is provided. The module assembly may include
a shell construction that defines a window opening, and
a module component which is fixed to the shell construction and forms at least one part of a sill flange extending along a longitudinal extension direction for attaching a seal in a sill region of the window opening.

In one or more embodiments, at least one flange section of the shell construction extending along the longitudinal extension direction and/or at least one flange section of the module component extending along the longitudinal exten- sion direction is provided for forming the sill flange. The flange section of the shell construction and/or the flange section of the module component in this case has at least one contact region protruding transversely to the longitudinal extension direction. A contact region protruding transversely to the longitudinal extension direction in this case protrudes, for example, transversely to a support plane along which a planar module component extends.

A potential alteration to the wall thickness may be com- pensated by such a protruding contact region when the components of the module assembly are assembled. The stiffness of the sill flange may be influenced thereby in a targeted manner, for example increased in a targeted manner. Accordingly, for forming the sill flange with a uniform wall thickness—optionally a wall thickness which is uniform over the entire width of the window opening, respectively the entire width of the sill flange—and/or for forming the sill flange with increased stiffness, at least one flange section of the shell construction or of the module component have the at least one contact region protruding in the direction of the other flange section of the respective other component of the module assembly. In this case, the shell construction and the module component form flange sections which abut each other for forming the sill flange. In the exemplary embodi- ment described above, therefore, at least one of these flange sections has at least one contact region protruding in the direction of the other flange section. As a result, a flange section of the shell construction and/or a flange section of the module component has at least one contact region which protrudes in the direction of an opposing flange section of the respective other component.

In principle, a shell construction is understood in this context as a shell body component that already defines the outer contour of a body component to be produced thereby. For finishing the body component, however, further com- ponents have to be attached to the shell construction. Gen- erally, the shell construction has at least one sheet metal component defining the outer contours of the body compo- nent to be produced. Accordingly, in a shell construction for a vehicle door, the shell construction comprises, for example, the door inner skin in the form of a door inner panel. Optionally, the shell construction may also consist of a plurality of sheet metal components which are already joined together, in the case of a shell construction for a vehicle door, for example, from a door inner skin and a frame reinforcement for the window opening. The shell construction, however, naturally does not necessarily have to consist of sheet metal and/or metal. For example, the shell construction may also comprise a shell body component made of a plastics material, for example from a thermoplas- tic material or duroplastic material.

In one or more embodiments—at least in a central region of the window opening, respectively of the sill flange— flange sections of the shell component and the module component abut each other at intervals, in a linear manner or in a planar manner only over the at least one protruding contact region. The respective contact region in this case protrudes at least slightly relative to the surrounding regions of the respective flange section, so that these surrounding regions do not bear against an opposing region of a flange section of the respective other component of the module assembly and a gap is present between these regions.

A flange section of the module component is generally formed on an upper edge of the module component. In this case, the flange section may extend on this edge in strip-like manner along the window opening.

In principle, the shell construction may be constructed in one piece or multiple pieces, the module component being fixed thereto. In one or more embodiments, the shell construction has a first shell component with at least one first flange section and a second shell component with a second flange section. For forming the sill flange, the first and second flange sections and at least one third flange section of the module component abut each other at least in one part of the sill flange. In such a region of the sill flange, therefore, three flange sections of the first and second shell components and of the module component bear against one another. As an example, in this context a sandwich-like arrangement of the flange sections may be provided. For example, in this case a first flange section of the first shell component is received in a sandwich-like manner between a second flange section of the second shell component and a third flange section of the module component. For example, based thereon a variant, in which the module assembly for a vehicle door is provided, provides that a flange section of a first shell component in the form of a door inner skin is received between a flange section of a module component in the form of a door module and a second shell component in the form of a frame reinforcement.

In one possible development, in at least one region of the sill flange, first, second and third flange sections of the first and second shell components and of the module component bear against one another, such as by, as described above, one of the flange sections being arranged, for example, in a sandwich-like manner between two other flange sections. In at least one further region of the sill flange, therefore, only two of the first, second and third flange sections bear against one another. Referring to the exemplary embodiment cited above, for example, it may be provided that the sill flange extends between two longitudinal sides of the window opening and at least in an end region of the sill flange on the longitudinal side the sill flange is formed in three layers, i.e. by three first, second and third flange sections of the first and second shell components and of the module component bearing against one another, whilst in a central region of the sill flange the sill flange is formed only in two layers, i.e. by two flange sections bearing against one another—at at least one point.

In the central region, for example, only one flange section of a shell component and one flange section of the module component bear against one another, and namely in this case optionally also only via at least one protruding contact region of one of these flange sections. In this manner, a thickening due to the three-layered construction of the sill flange in an end region on the longitudinal side may be compensated in a region with a double-layered construction by the provision of at least one protruding contact region, and the sill flange may have a uniform wall thickness over the entire width. Accordingly, it may also be provided that the at least one protruding contact region is provided in the region of the sill flange in which only two of the first, second and third flange sections of the different components bear against one another. By the bearing of the two flange sections in the central region of the sill flange, said sill flange is also sufficiently stiff in the central region.

For example, the at least one protruding contact region is formed by a bead on a flange section. By the configuration of a bead on a flange section this flange section on one side—for example, in the case of a vehicle door, an inner face of the flange section facing the interior—forms a recess which is associated with a simultaneous raised section on the opposing (outer) face of the flange section. In this manner, a protruding contact region may be configured without additional material in the region of the respective flange section.

Alternatively or additionally, the at least one protruding contact region may be formed by at least one rib provided on a flange section. A rib of a contact region provided for bearing against the other component of the module assembly, for example, may be shaped on the respective flange section or integrally formed thereon. In the latter case, the at least one rib is, for example, injection-molded onto the flange section. As an example, it may be provided that a rib is provided on a flange section for forming a protruding contact region and, on the same flange section or an opposing flange section of the other component, a protruding contact region is formed by a bead.

In one or more embodiments, at least two respectively protruding contact regions which are spaced apart from one another or two partial regions which are spaced apart from one another of a protruding contact region are provided along a width of the sill flange extending along the longitudinal extension direction, a non-protruding intermediate region being present therebetween. At least in a sill region of the sill flange, therefore, protruding and non-protruding regions and/or partial regions alternate on a flange section of the shell construction or of the module component. Two partial regions spaced apart from one another of one and the same protruding contact region are connected together, but along the longitudinal extension direction a non-protruding intermediate region is located therebetween. Such partial regions are formed, for example, by a contact region running along the longitudinal extension direction in a meandering manner.

In one or more embodiments, at least two respectively protruding contact regions which are spaced apart from one another or two partial regions which are spaced apart from one another of a protruding contact region are provided along a width of the sill flange, a sill region of the sill flange running therebetween, in which sill region a flange section of the module component does not bear against a flange section of the shell construction. In such a variant, as a result, over a plurality of (at least two) protruding contact regions and/or over a plurality of (at least two) successive partial regions along the longitudinal extension direction of one and the same protruding contact region, in each case merely a locally defined bearing of two flange sections is provided along a width of the sill flange. In the sill regions in which no flange section of the module component bears against a flange section of the shell component, a gap is permitted between the shell construction and the module component. The bearing of the two flange sections, which is merely local and thus spaced apart spatially relative to one another along the width of the sill flange, ensures a defined bearing of the two flange sections against one another (for example, in a central sill region of the sill flange) without having to configure a contact region protruding over the entire width on one of the flange sections or having to provide a large-surfaced bearing of the module component against the shell construction.

For example, first and second sill regions may alternate along a part of the width of the sill flange, wherein in a first sill region a flange section of the module component and a flange section of the shell construction abut each other via at least one protruding contact region, and in a second sill region a gap is defined between the flange section of the module component and the flange section of the shell construction.

Alternatively or additionally, at least two partial sections of the sill flange, which are provided one above the other, are provided along the longitudinal extension direction, with in each case (a) at least two respectively protruding contact regions which are spaced apart from one another or (b) at least two partial regions, which are spaced apart from one another, of a protruding contact region. These at least two partial regions may be configured, such as rows running parallel to one another with in each case protruding and non-protruding regions and/or partial regions alternating along the longitudinal extension direction.

In one or more embodiments, at least one flange section of the module component or the shell construction has an undulating contour in longitudinal section. In principle, such an undulating contour may be partially formed by at least one protruding contact region. Thus alternating regions with and without a protruding contact region along an extension direction of the flange section and thus along the width of the sill flange may define an undulating contour of the flange section. In principle, it should be mentioned here that an undulating contour is also expressly understood as contours in which raised sections and recesses, respectively crests and troughs of the contour (in sectional view), are not bulged in a circular arc shape. Instead, an undulating contour is also intended to encompass the fact that the contour at least partially runs in a rectangular, or trapezoidal, manner.

In one or more embodiments, the undulating contour is formed by one of the above-mentioned partial sections which are provided one above the other along the longitudinal extension direction. In this case, for example, both a first partial section with an undulating contour in longitudinal section and a further second partial section below or above said first partial section with at least one protruding contact region may be provided on a flange section of the shell construction or the module component. As an example, two partial sections, which are provided one above the other, in each case may have an undulating contour in longitudinal section.

As an example, the undulating contours of two partial sections may also run in opposition of phase relative to one another. Such undulating partial sections offset to one another may additionally improve the seal. Thus, for example, two sealing lips of the (channel) seal arranged one above the other do not both bear against a (set-back) side of a protruding contact region, respectively against a non-protruding intermediate region. Instead an (upper) sealing lip bears against a contact region of a first (upper) partial section, whilst the other (lower) sealing lip bears against an intermediate region of the other second (lower) partial section. As a result, the possibility of moisture penetration is further impeded and thus the seal improved.

In this regard, an undulating contour of a flange section may also be combined with first and second sill regions alternating with one another, such that along at least one part of the width of the sill flange, the undulating contour runs in opposition of phase relative to the first and second sill regions alternating with one another, in which alternately a contact of the flange sections over at least one protruding contact region is present or not present. The undulating contour may in this case also be provided on one of the flange sections of the shell construction or of the module component, whilst the first and second sill regions running in opposition of phase are provided on the opposing other component, i.e. the module component or the shell construction.

In one or more embodiments, a protruding contact region extends along the longitudinal extension direction and runs in a meandering manner on the shell construction or the module component. In this variant, therefore, an elongated contact region is provided which along its extension relative to the window opening forms partial regions running transversely upwardly or downwardly.

In one or more embodiments, as has already been described above, both an elongated flange section of the shell construction and an elongated flange section of the module component run in a central sill region of the sill flange (between two opposing frame sections of the shell construction delimiting the window opening). In a module assembly for a vehicle door, in which the shell construction comprises a door inner skin and a frame reinforcement, for example, a flange section of the door inner skin and/or a flange section of a frame reinforcement extends continuously below the window opening. The module support which is fixed to the shell construction thus forms the sill flange together with the at least one flange section of the shell construction.

Alternatively, a central sill region of the sill flange is exclusively formed by a flange section of the module component. The central sill region in this variant is at least locally or entirely free of a shell construction and thus designed to be free of metal in the case of a module component produced from (fiber-reinforced) plastics and, as an example, by means of an organic sheet. One or more, such as alternately protruding, contact regions thus serve in this case primarily for achieving a sufficient stiffness of the flange section on the module component side, the seal being able to be secured thereto. To this end, additional ribbed sections may also be provided on a flange section on the module side. When using an organic sheet for the module component, the organic sheet may also be designed to be correspondingly thick-walled.

In one or more embodiments, a central sill region of the sill flange may be exclusively formed by a flange section of the module component, naturally also the variants described above for the design of a flange section on the module side may also be used. As an example, at least two partial sections of the sill flange, which are provided one above the other, with in each case (a) at least two respectively protruding contact regions which are spaced apart from one another or (b) at least two partial regions which are spaced apart from one another of a protruding contact region, such as of a contact region running in a meandering manner, are provided at least in the central sill region of the sill flange, which is exclusively formed by the flange section of the module component, along the longitudinal extension direction.

As an example, a seal which may be arranged on the sill flange of the module assembly may be positioned on the sill flange. In a variant, therefore, the module assembly, for example, comprises a seal which has a positioning section via which the seal is positioned on the sill flange. By means of the positioning section the seal is positioned, for example, onto the sill flange such that the positioning section encompasses the sill flange.

As already mentioned above, in principle the proposed module assembly may be provided for a vehicle door. Alternatively or additionally, the module component may be a component, such as a planar component, an opening in the shell construction being at least partially covered thereby.

For example, the window opening is closable by means of an adjustable window pane, and at least one functional component of a window lifter, which is provided for adjusting the window pane, is provided on the module component. A functional component of the window lifter, such as for example a guide rail, may be configured in this case by the module component. Alternatively or additionally, a (further) functional component of the window lifter, such as for example a drive motor generating an adjusting force for the adjustment of the window pane, or a displaceably guided driver element connected to the window pane, may be arranged on the module component as a separate component, such as fastened thereto. The module component may, such as, be a door module for a vehicle door.

In one or more embodiments, the module component may be configured as an organic sheet component. The module component thus comprises, for example, at least one region made of an organic sheet. Additionally, regions made of a plastics material, for example a thermoplastic material, such as polypropylene may be provided. A region of the module component produced from a plastics material may in this case also be fiber-reinforced. As a result, for example, the module component may be, such as, a long fiber-reinforced plastics material.

In one or more embodiments, a vehicle door may be provided with a module assembly may be provided.

In one or more embodiments, such a vehicle door comprises an adjustable window pane, the window opening being closable thereby, and the module component has at least one functional component of a window lifter provided for the adjustment of the window pane, wherein this module component, for example a door module, together with at least one flange section of a door shell construction, forms the sill flange for a (channel) seal of the window opening.

BRIEF DESCRIPTION OF THE DRAWINGS

The accompanying figures illustrate by way of example possible variants of the proposed solution.

In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
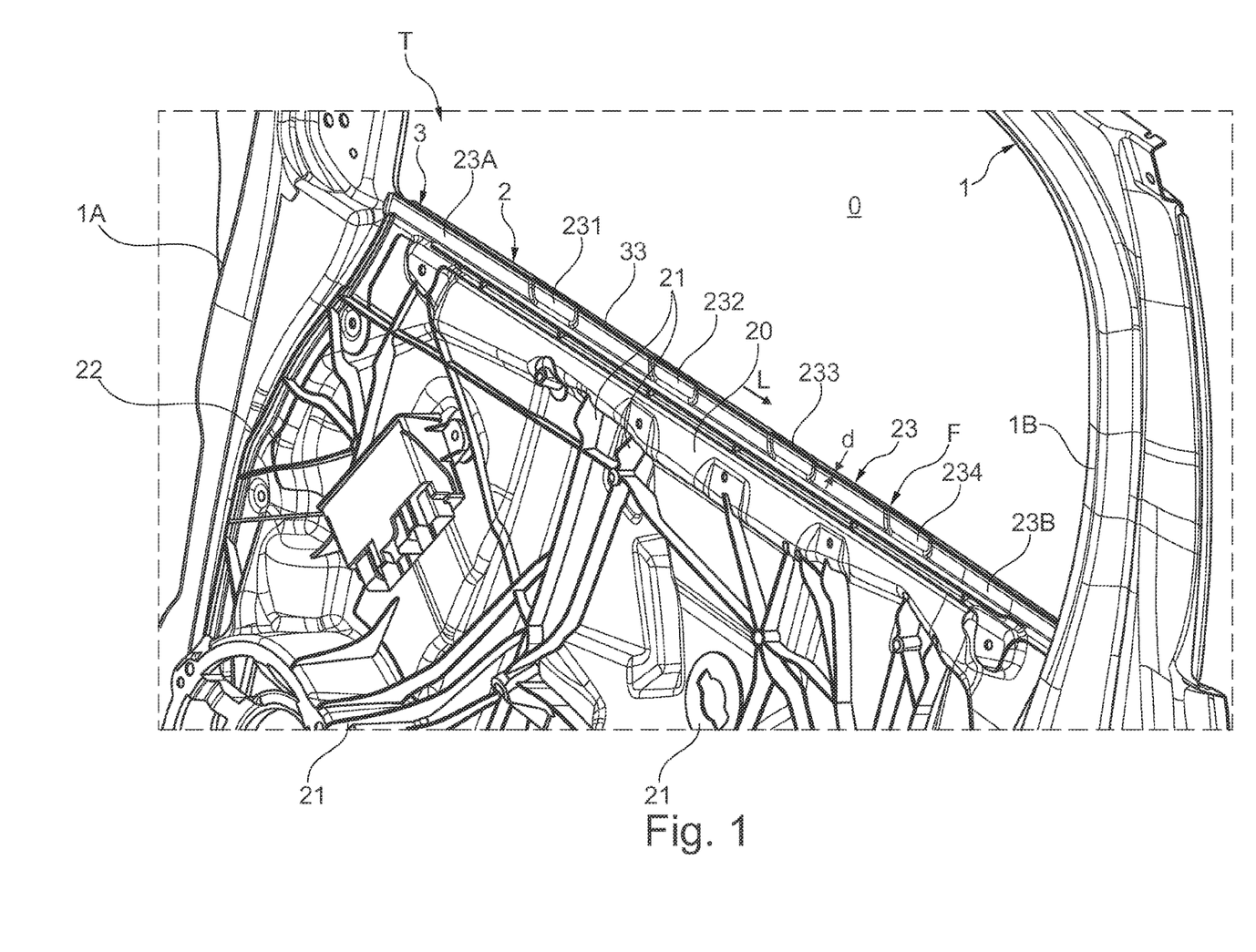
FIG. 1 shows in a detail and in perspective view a vehicle door with a variant of a proposed module assembly with a view of an inner side, wherein a sill flange of a window opening of the vehicle door is formed, on the one hand, by flange sections of the door shell construction and, on the other hand, by a flange section of a planar door module.

FIG. 1 shows in a detail and in perspective view with a view of an inner side facing the vehicle interior, a vehicle door of a motor vehicle. A door shell construction T of the vehicle door in this case is formed by a first shell component in the form of a door inner skin 1 and a second shell component in the form of a frame reinforcement 3. The door shell construction T defines in this case, on the one hand, a window opening O which in the intended assembled state of the vehicle door may be closed by an adjustable window pane. On the other hand, the door shell construction defines fastening points for a module component in the form of a door module 2 to be arranged in the vehicle door. This door module 2 closes a cavity provided in the vehicle door and is provided for carrying different functional components of the vehicle door, such as for example a loudspeaker, as well as functional components of a window lifter provided for adjusting the window pane.

The door module 2 defines, on the one hand, a support surface 20 to which the different functional components may be fastened. This support surface 20 is substantially formed by an organic sheet. Different reinforcing and interface structures 21 as well as a module edge 22 are injection-molded onto this support surface 20 from a plastics material, for example a fiber-reinforced polypropylene. Potential reinforcing structures are formed here, for example, by reinforcing ribs. The interface structures define, for example, fastening points for the fastening of the door module 2 to the door shell construction T as well as for attaching functional components to the door module 2, such as for example an interface for connecting a drive motor of the window lifter or an interface for the attachment of a loudspeaker. The module edge of the door module 2 circulating over the periphery is also configured by the injection-molded plastics material, as well as a flange section 23 extending in a strip-like manner on an upper edge of the door module 2.

The flange section 23 serves primarily for forming a sill flange F on the sill of the window opening O. A channel seal 5, not shown in FIG. 1, may be secured to this sill flange F in order, such as, to protect the interior of the vehicle against the penetration of moisture via the window opening O.

(0049) In this case, the flange section 23 on the module side forms only one part of the sill flange F. A further part of the sill flange F is defined by the door shell construction T. In this case, a flange section 33 of the frame reinforcement 3 extends along a longitudinal extension direction L between two longitudinal sides of the window opening O over the entire width of the window opening O and thus in the intended assembled state of the vehicle door opposite the flange section 23 of the door module 2. In each case, an edge-side flange section 10A or 10B of the door inner skin 1 is provided on the longitudinal side ends of the window opening O, said flange section also forming a part of the sill flange F.

An edge-side flange section 10A or 10B of the door inner skin 1 is shaped on a frame section 1A or 1B of the door inner skin 1 which, in the intended mounted state of the vehicle door on a vehicle, is arranged in the region of an A-pillar (frame section 1A) or a B-pillar (frame section 1B)

of the vehicle (when the vehicle door is closed). The respective frame section 1A, 1B of the door inner skin 1 also defines in this case in the variant shown a part of the frame of the window opening running above the window sill.

Figure 2A:
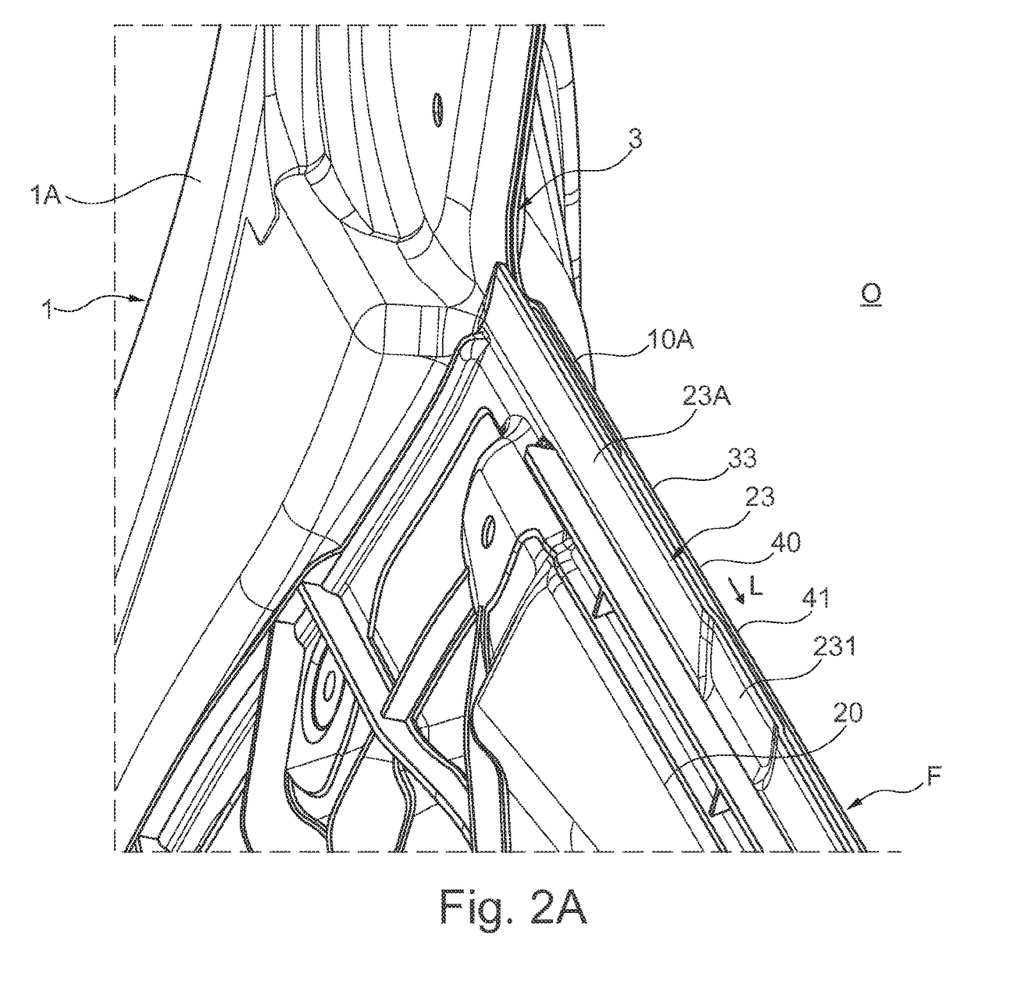
FIGS. 2A-2C show in each case in a detail and in enlarged scale individual regions of the sill flange.
Figure 2B:
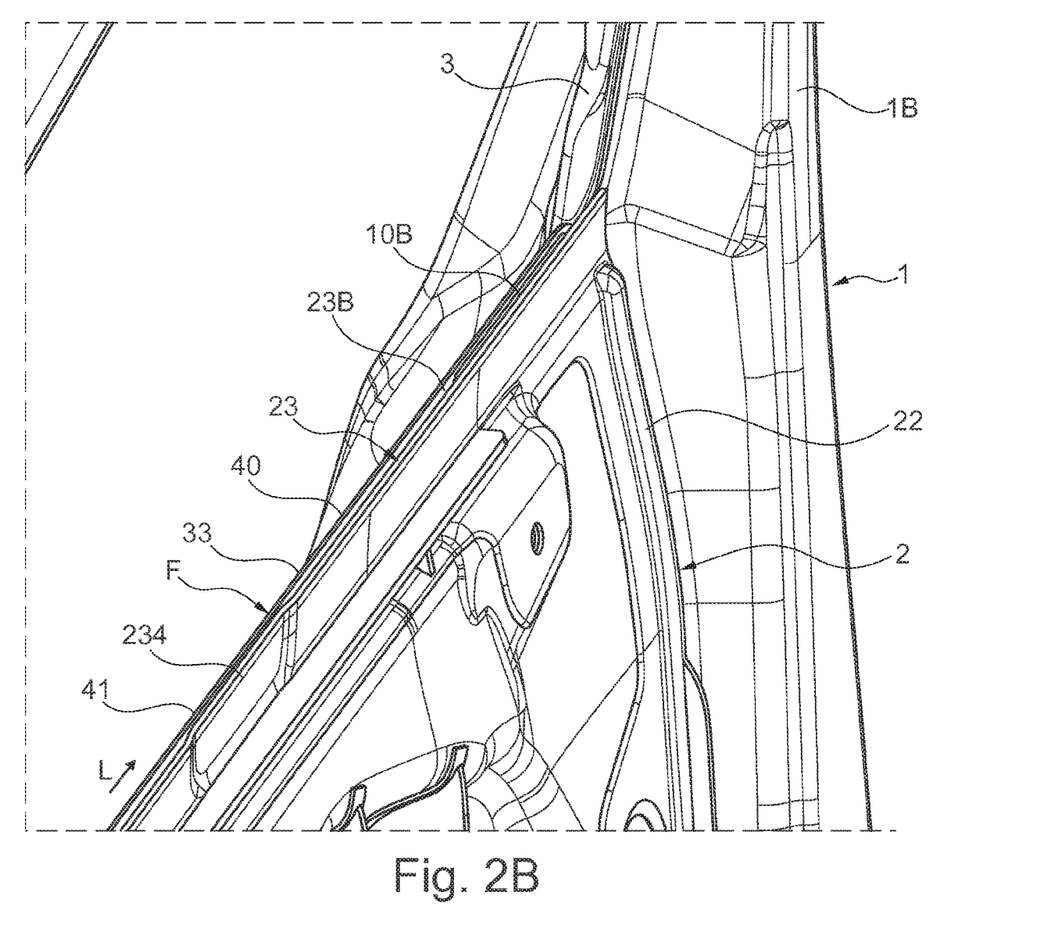
Figure 2C:
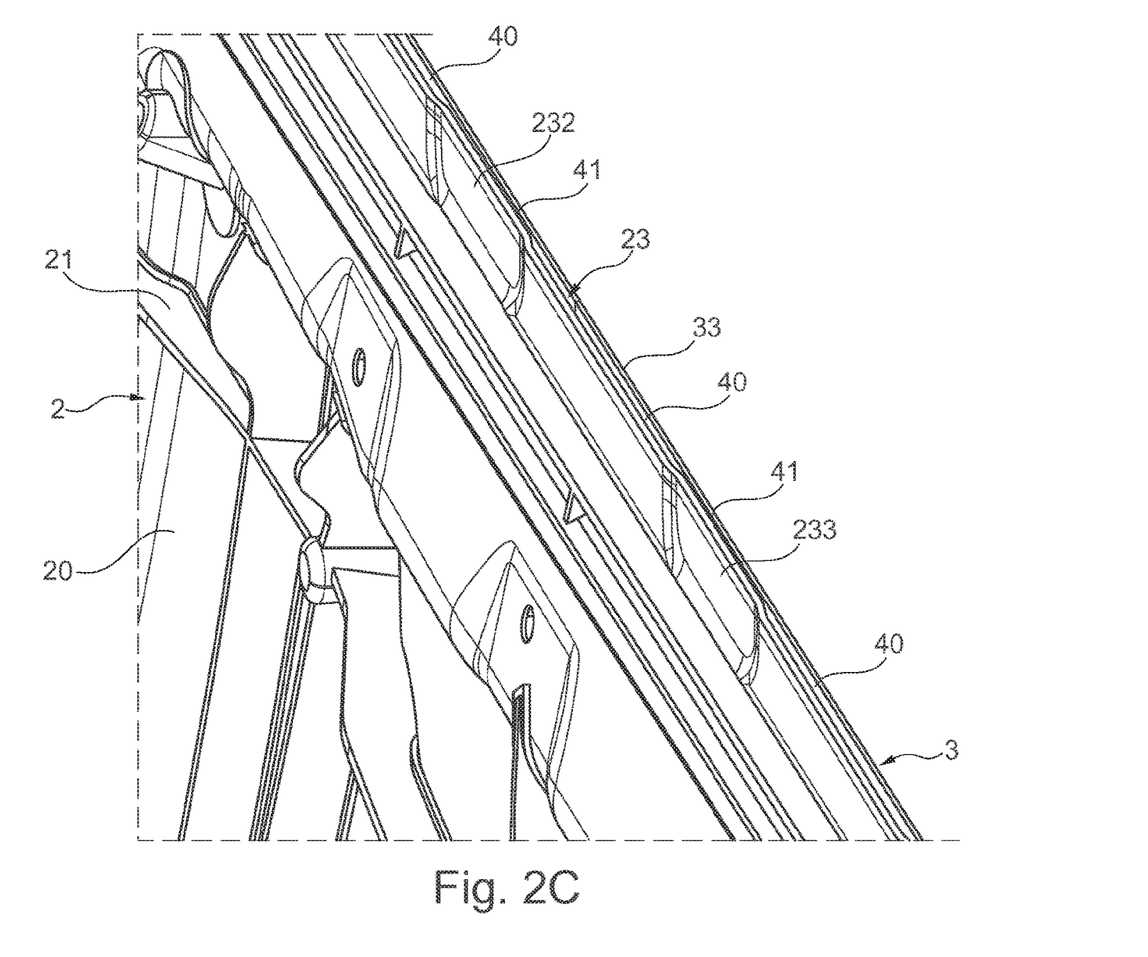

The edge-side flange sections 10A and 10B of the door inner skin 1 protruding in each case in the direction of the opposing frame section 1B or 1A serve, for example, for fixing the door module 2 directly to the door inner skin 1. As is visible, for example, using the enlarged view of the FIGS. 2A and 2B, the sill flange F on a frame section 1A or a frame section 1B of the door inner skin 1 is constructed in three layers by three flange sections bearing against one another. In this case, both a flange section 10A/10B of the door inner skin 1 and a flange section 33 of the frame reinforcement 3 and the flange section 23 of the door module 2 bear against one another. An edge-side flange section 10A or 10B in this case is received in a sandwich-like manner between the module-side flange section 23 and the flange section 33 of the frame reinforcement 3. In the (central) region of the sill flange (F) between the frame sections 1A and 1B accordingly only the module-side flange section 23 and the flange section 33 of the frame reinforcement 3 oppose one another in order to form the sill flange F.

In order to ensure in this case a wall thickness d of the sill flange F which is uniform along the width of the sill flange F and thus a width of the window opening O, as well as to ensure a sufficient stiffness of the sill flange F, in the present case the module-side flange section 23 of the module assembly shown is configured with a plurality of contact regions 231, 232, 233 and 234 protruding in the direction of the opposing flange section 33 of the frame reinforcement 3. Each contact region in this case is formed by a bead 231, 232, 233 or 234 configured on the flange section 23 of the door module 2 running in a strip-like manner. The flange section 33 of the frame reinforcement 3 and the flange section 23 of the door module 2 thus only bear locally against one another over a large part of the width of the sill flange F.

On the beads 231 to 234 of the flange section 23 in this case a surface contact 41 is created between the frame reinforcement 3 of the door shell construction T and the flange section 23 of the door module 2. In the sill regions of the sill flange F located therebetween a gap 40 is located between the flange section 33 of the frame reinforcement 3 and the flange section 23 of the door module 2 and in each case in a sill region between a bead 231 or 234 and a longitudinal-side end region 23A or 23B of the module-side flange section 23, in which the module-side flange section 23 adjoining the respective frame section 1A or 1B bears against the associated edge-side flange section 10A or 10B of the door inner skin 1.

Via the beads 231 to 234 a gap 41 is bridged locally and at a plurality of points along the width of the sill flange F offset to one another, said gap resulting from the three-layered construction of the sill flange F on the (right-hand and left-hand) end regions of the window opening O. The resulting sill flange F consequently has a uniform wall thickness d over the entire width of the window opening O. By the merely locally provided beads 231 to 234 and a large-surfaced bearing, which is thus avoided, of the module-side flange section 23 on the flange section 33 of the frame reinforcement 3 of the door shell construction T over the entire width of the window opening O only a local metal-plastics pairing is provided between the metal door shell construction T and the flange section 23 of the door module 2 produced from a plastics material. Such a merely local bearing of the flange section 33 of the door shell construction T and the flange section 23 of the door module 2 takes into account the different tolerances and the variable warpage associated therewith of the different materials of the door shell construction T, on the one hand, and of the door module 2, on the other hand, which with a large-surfaced bearing against one another could potentially lead to problems when mounting the channel seal 5.

In principle, the beads 231 to 234 (and the alternatively designed protruding contact regions) may be spaced apart from one another and dimensioned such that an undulating contour of the flange section 23 of the door module 2 is present in longitudinal section. As an example, by varying the spacings and dimensions of the beads 231 to 234 of the flange section 23, the stiffness of the sill flange F which is formed thereby may be influenced in a targeted manner.

Optionally, in addition to the beads 231 to 234 additional partial sections may be configured with an undulating contour below the beads 231 to 234 on the flange section 23 of the door module 2. This undulating contour in this case may be designed in opposition of phase relative to an undulating contour defined by the beads 231 to 234 of the region of the flange section 23 located at the top.

In principle, instead of an individual bead or instead of a plurality of beads or all of the beads 231 to 234, at least one rib may also be provided, said rib ensuring a bearing of the flange sections 23 and 33 over the gap 40. Such a rib may, for example, be injection-molded on a module-side flange section 23. Alternatively or additionally, naturally the flange section 33 of the frame reinforcement 3 may also have one or more contact regions protruding in the direction of the flange section 23 of the door module 2. For example, protruding contact regions of the flange section 33 of the frame reinforcement 3 and of the flange section 23 of the door module 2 may alternate with one another along the width of the window opening O, respectively of the sill flange F.

Figure 3A:
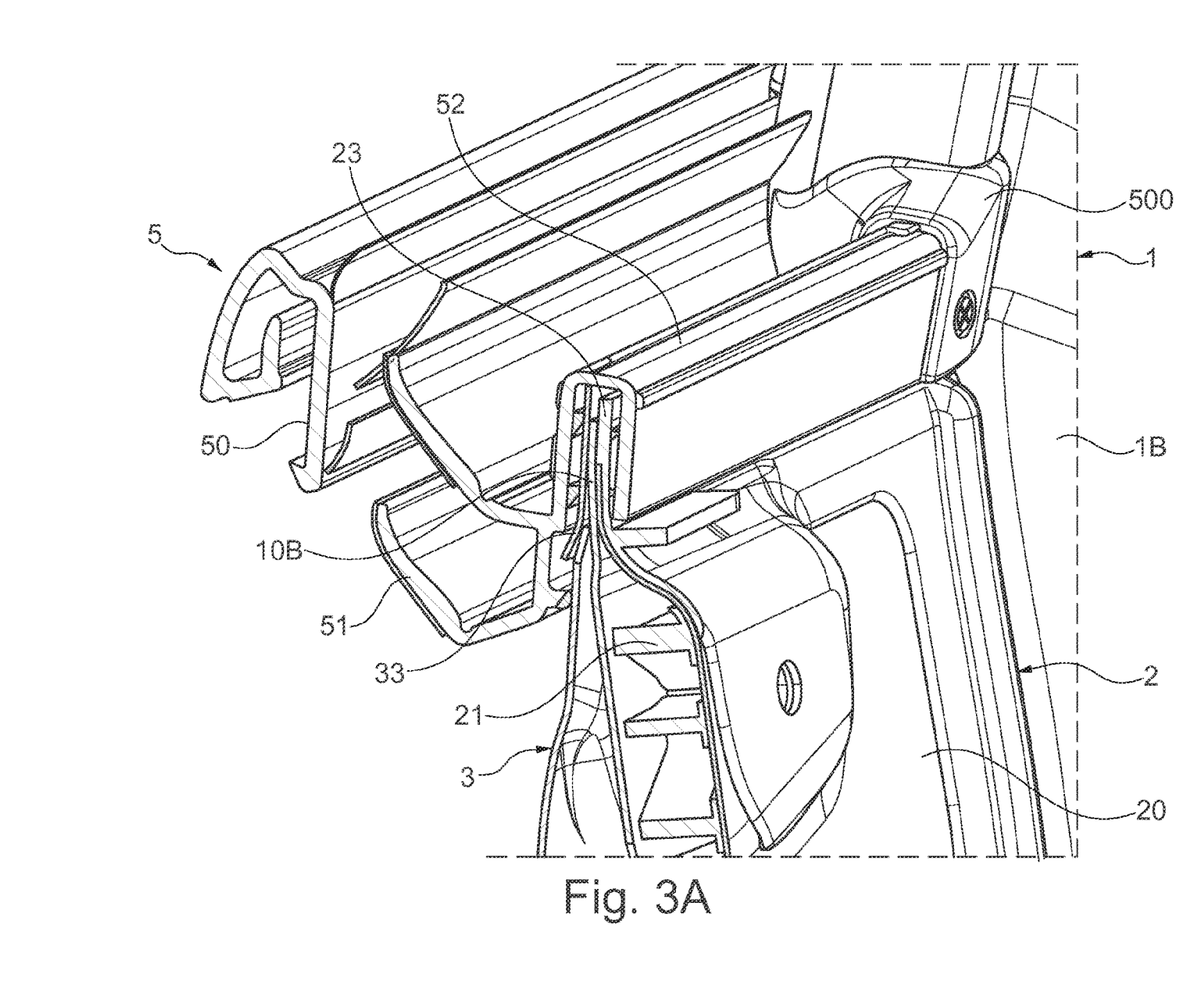
FIGS. 3A-3C show in each case in perspective and in different positions sectional views of the vehicle door with a channel seal attached to the sill flange.
Figure 3B:
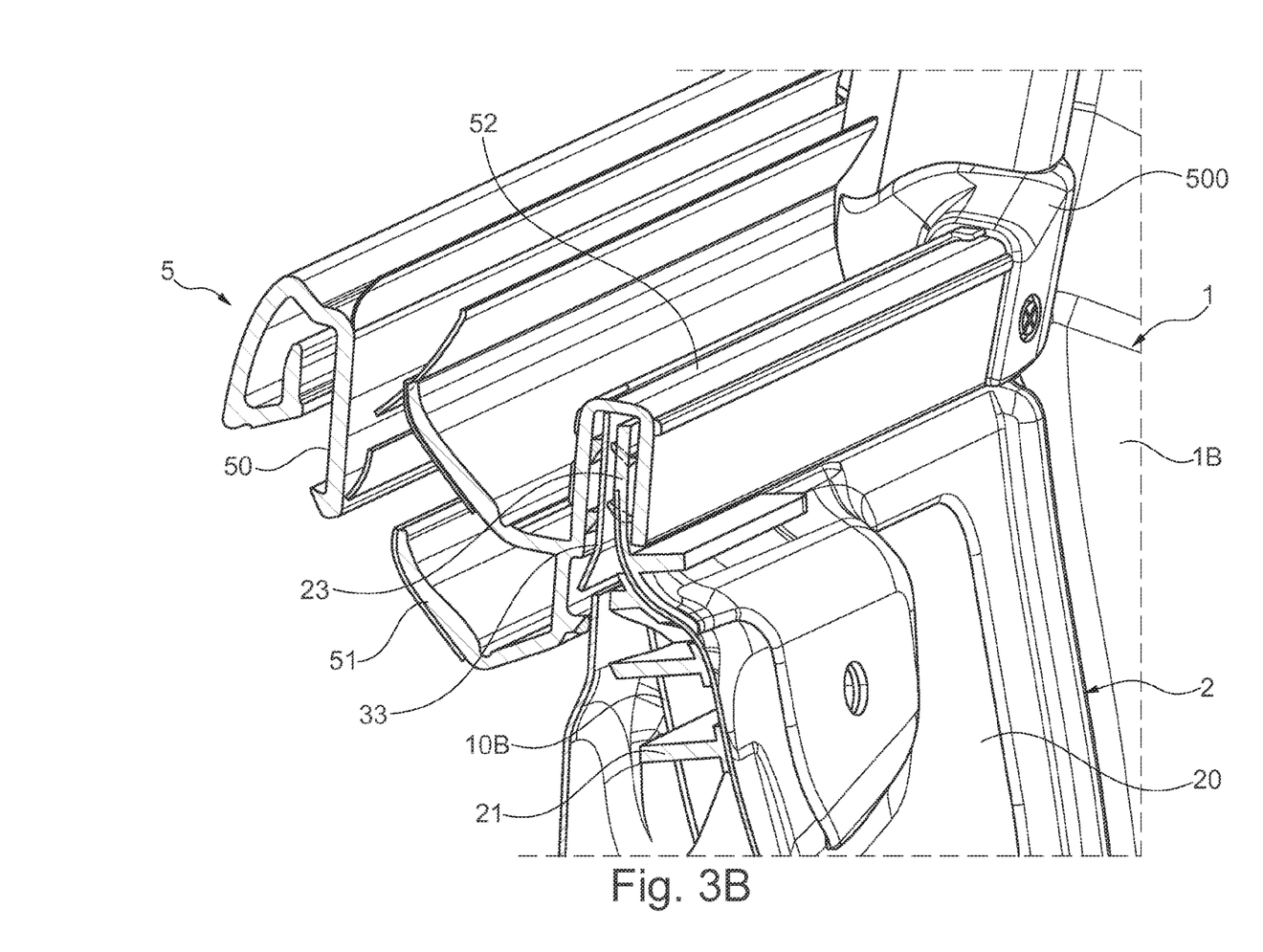
Figure 3C:
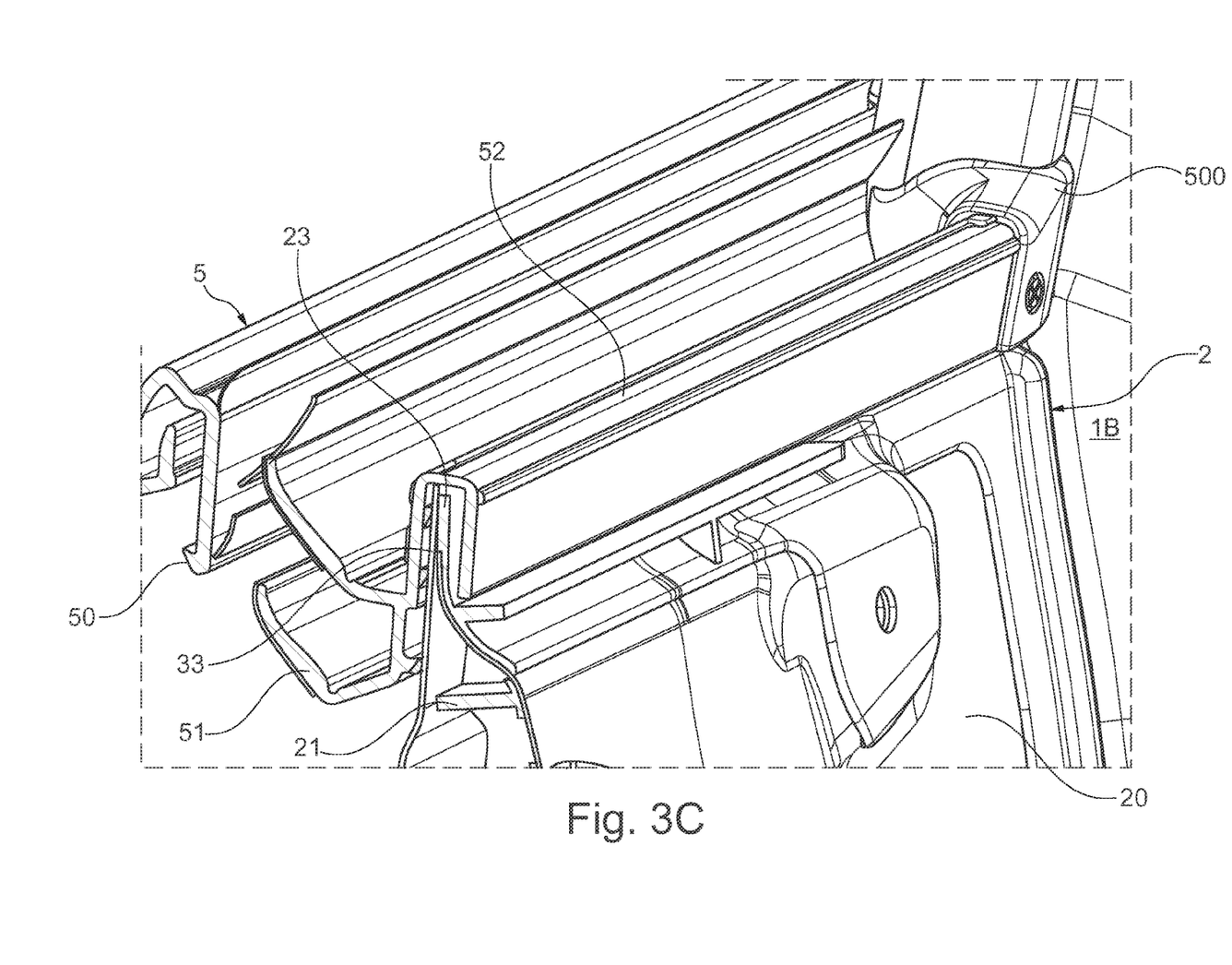

The solution shown by way of example, in a channel seal 5 mounted according to FIGS. 3A to 3C on the door shell construction T and on the door module 2, ensures in a simple manner a permanently high sealing pressure onto the window pane to be provided on the window opening O, for example since the sill flange F in the case of a uniform wall thickness d has a sufficiently high stiffness. The different sections of the FIGS. 3A, 3B and 3C along the width of the sill flange F illustrate the uniform wall thickness d of the sill flange F in spite of the different number of flange sections 33, 10B, 23 and 33, 23 of the door shell construction T and of the door module 2 bearing against one another along the extension direction of the sill flange F between the two longitudinal-side edge sections 1A and 1B.

The channel seal 5 in this case has, in a manner known per se, an inner and outer seal 51 and 50 and is fixed via a plurality of fastening sections 500 to the window frame formed by the frame sections 1A and 1B of the door inner skin 1. In this case, the channel seal 5 is positioned via a positioning section 52 on the sill flange F such that the fastening flange F is encompassed by the positioning section 52 of the channel seal 5. The proposed construction of the sill flange F in this case ensures a simple mounting of the channel seal 5 and ensures a high connection strength between the channel seal 5 and the sill flange F.

Figure 6:
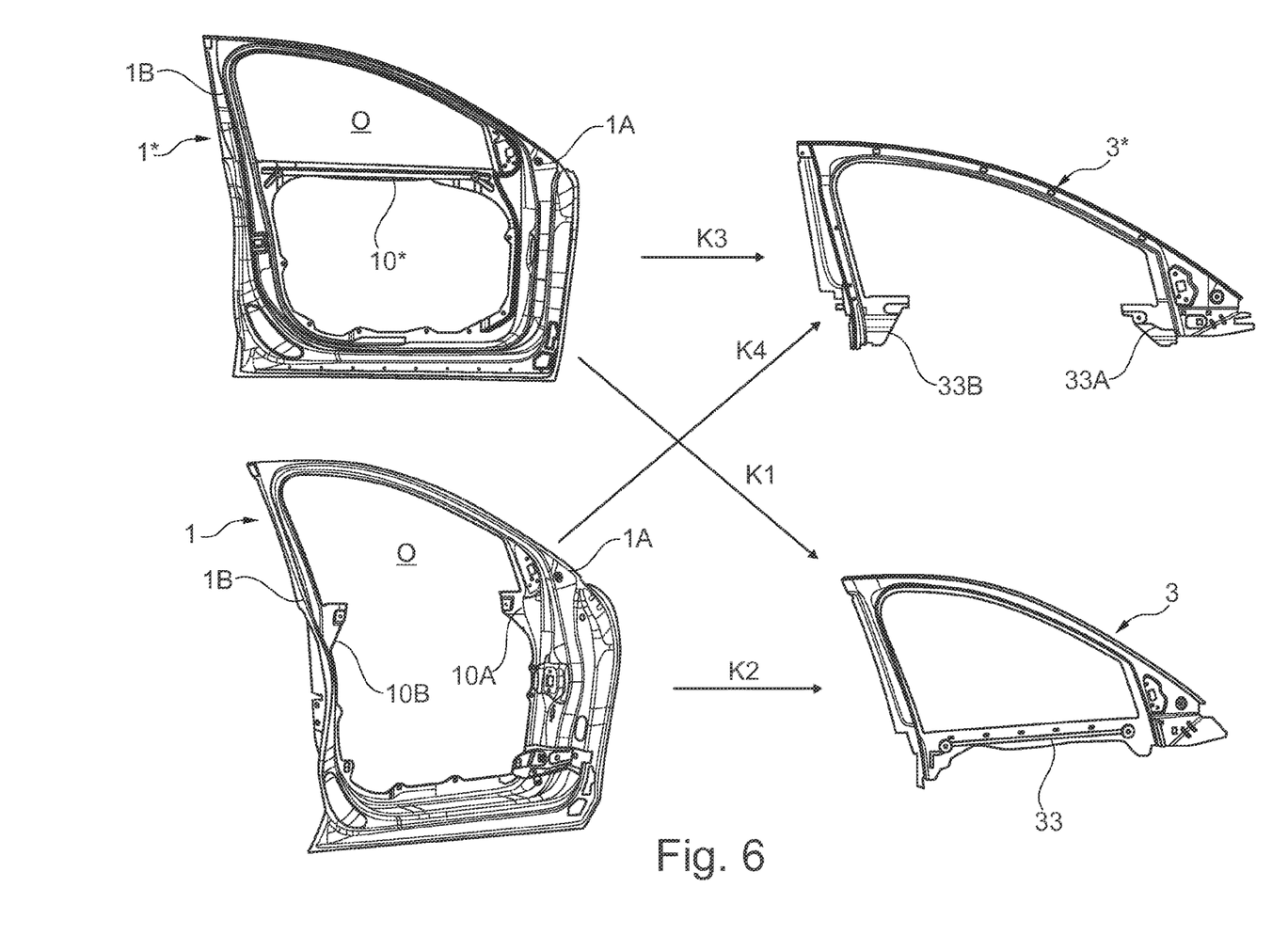
FIG. 6 shows a view of different shell construction variants which in each case are formed from a door inner skin and a frame reinforcement.

As is visible with reference to FIG. 6, a combination of a door inner skin 1 and a frame reinforcement 3 forming the basis of the above-described variants, represents only one of a plurality of possible combinations for forming a door shell construction T. In a combination K2 of FIG. 6 based on the above-mentioned variants, the door inner skin 1 in the region of the sill of the window opening O only forms the edge-side flange sections 10A and 10B. A central region of the sill flange F between the two longitudinal sides of the window opening O is defined on the shell construction side by the elongated flange section 33 of the frame reinforcement 3 which, in the intended assembled state of the vehicle door, opposes the flange section 23 of the door module 2.

According to FIG. 6, however, for example a combination K1 of a door inner skin 1* and the frame reinforcement 3 is also conceivable in which the door inner skin 1* additionally forms a flange section 10* extending between the two longitudinal sides. This flange section 10* connects, therefore, the two frame sections 1A and 1B of the door inner skin 1 together. In a central sill region of the sill flange F, therefore, both the flange section 10* of the door inner skin 1* and the flange section 33 of the frame reinforcement 3 and also the flange section 23 of the door module 2 provided for forming the sill flange F are present in principle.

In a combination K3 of a door shell construction T, a door inner skin 1* is combined in turn with a continuous flange section 10* with a frame reinforcement 3* which in the sill region below the window opening O does not form a continuous flange section 33. In this variant the frame reinforcement 3* only forms two opposing and edge-side flange sections 33A and 33B extending toward one another. These flange sections 33A and 33B of the frame reinforcement 3*, comparable with the edge-side flange sections 10A and 10B of a door inner skin 1, thus serve for fixing the frame reinforcement 3* to the door inner skin 1* and for providing fastening points for the door module 2 on the longitudinal sides of the window opening O. A central sill region of the sill flange F in a vehicle door, which is produced from a door shell construction T with the door inner skin 1* and the frame reinforcement 3* and a door module 2, therefore, is consequently formed by the opposing flange sections 10* and 23 of the door inner skin 1* and of the door module 2.

Moreover, a door shell construction T may also be formed by a combination K4 according to FIG. 6. In this combination K4, the door inner skin 1 is combined with the edge-side flange sections 10A and 10B—and thus without a flange section 10* connecting both longitudinal sides—with a frame reinforcement 3* which also does not have a continuous flange section 33. In a vehicle door produced with such a door shell construction T, therefore, a central sill region of the sill flange F is exclusively formed by the flange section 23 of the door module 2. A stiffness of the flange section 23 on the door module side, which is sufficient therefor, may be achieved in this case by a corresponding ribbed section and/or beading of the flange section 23 and/or the use of a thick-walled organic sheet. Additionally, the flange section 23 may be configured with one or more rows of protruding contact regions, for example in the form of beads 231 to 234, as are used in the above-described FIGS. 1 to 3C or FIGS. 4A-4B and 5 described below. If the central sill region of the sill flange F is exclusively formed by the flange section 23 of the door module 2, the central sill region is designed entirely without a shell construction and thus without metal.

Figure 4A:
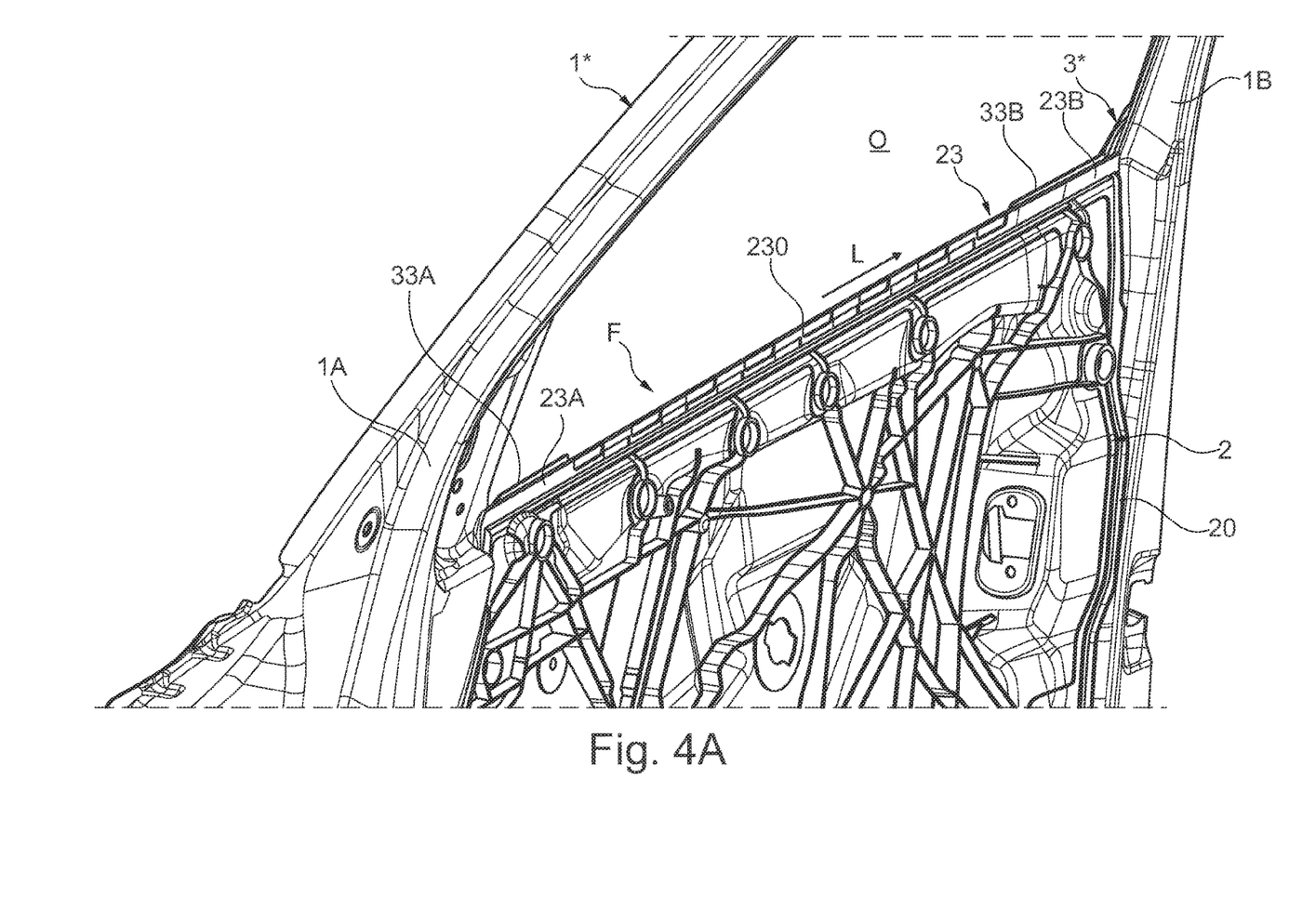
FIGS. 4A-4B show in each case in a detail and in perspective view a further variant of a proposed module assembly in which two partial sections running in opposition of phase relative to one another, in each case defining a contour running in an undulating manner in longitudinal section, are configured on a flange section of a planar module component, said partial sections being provided one above the other and in each case protruding and non-protruding regions alternating thereon.
Figure 4B:
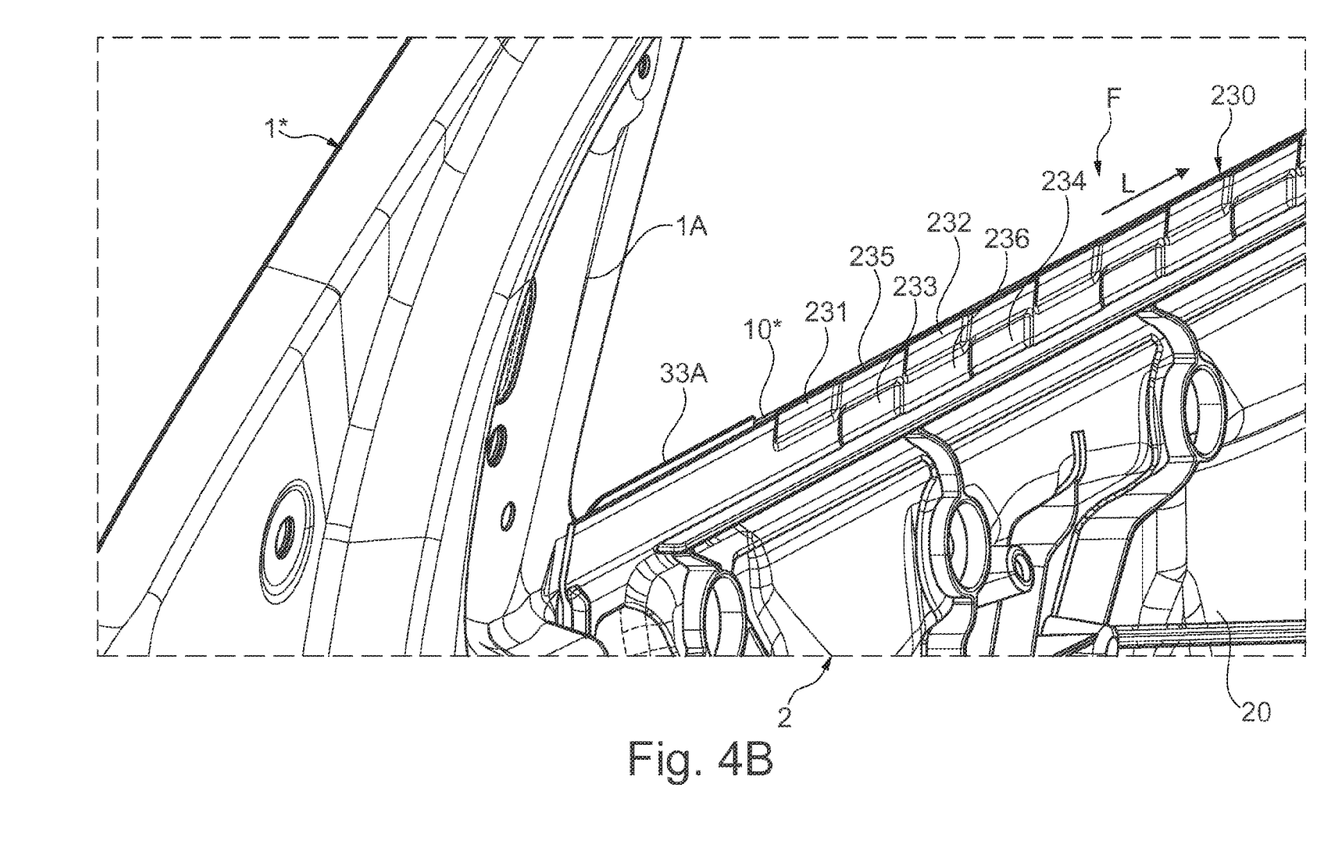

In a variant shown in FIGS. 4A and 4B, the door shell construction T is based on a combination K3 corresponding to FIG. 6, i.e. the combination of a door inner skin 1* with a flange section 10* with two edge-side flange sections 33A and 33B connecting the two frame parts 1A and 1B with a frame reinforcement 3*. Thus in the central sill region of the sill flange F, when the vehicle door is assembled as intended, the flange section 23 of the door module 2 and the flange section 10* of the door inner skin 1* assembled to the frame reinforcement 3*, oppose one another.

In this variant, the flange section 23 has a double-row undulating structure 230 with two partial sections provided one above the another, in which in each case protruding and non-protruding regions 231, 235, 232 or 232, 236, 233 which alternate with one another are provided along the longitudinal extension direction L. Between two beads 231 and 232 or 233 and 234 of such a partial section is located in each case an intermediate region 235 or 236 in which the flange section 23 does not protrude in the direction of the opposing flange section 10* of the door inner skin 1*. The two partial sections of the undulating structure 230 thus define in each case a row extending along the longitudinal extension direction L with protruding and non-protruding regions 231, 235 and 232 or 233, 236 and 234 alternating with one another. These regions 231, 235 and 232 or 233, 236 and 234 of a partial section define in each case an undulating contour in a longitudinal section.

The two rows are provided with their protruding and non-protruding regions 231, 235, 232 or 233, 236 and 234 running in opposition of phase on the flange section 23. Thus a bead 231 or 232 of an upper partial section, respectively a row of this upper partial section, in each case is located in the vicinity of a non-protruding intermediate region 236 of the lower partial section, respectively a lower row of this lower partial section. By the offset of the beads 231 to 234 arranged in opposition of phase relative to one another, in a side view of the mounted module assembly the beads 231 to 234 follow the path of an undulating line which extends along the longitudinal extension direction L. In side view both partial sections, therefore, define an undulating path for the individual contact regions of the flange section 23 protruding in the direction of the flange section 10* on the shell construction side, in the form of beads 231 to 234. At the same time, each partial section of the undulating structure 230 in longitudinal section defines an undulating contour.

By the corresponding offset of the beads 231, 232 and 233, 234 of the two partial sections, sealing lips of the channel seal 5 always bear locally against different types of region. Thus, for example, an upper sealing lip of the channel seal 5 bears against a bead 231 or 232 of the first upper partial section, whilst the other lower sealing lip of the channel seal 5 bears against a non-protruding intermediate region 236 of the second lower partial section. As a result, the penetration of moisture via the window sill is further impeded.

Deviating from the view of FIGS. 4A and 4B, in an alternative variant, two (for example in each case single-row) undulating structures on a door module side flange section 23, on the one hand, and a shell construction side flange section 10* or 3, on the other hand, may also be combined together. Relative to the window opening O, therefore, for example an upper (lower) row of alternately protruding and non-protruding contact regions may be configured on the flange section 23 of the door module 2, whilst a flange section 10* or 3 located therebelow (thereabove) of the shell construction T is provided with a row of alternately protruding and non-protruding regions—in the direction of the flange section 23 of the door module 2.

Figure 5:
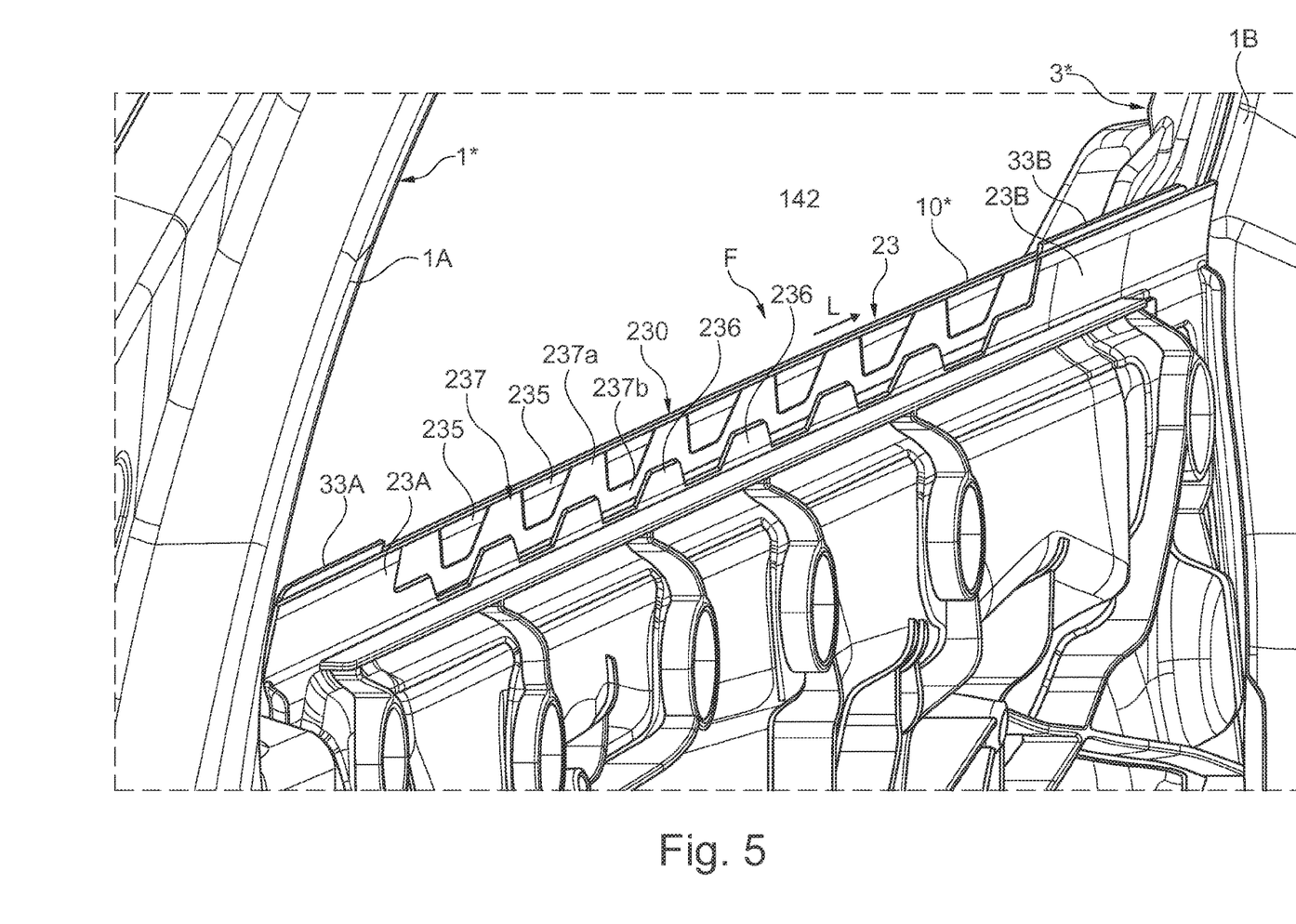
FIG. 5 shows in a detail and in perspective view a further variant of a proposed module assembly in which a protruding contact region running in a meandering manner is configured on a flange section of the planar module component.

In the variant of FIG. 5 the module-side flange section 23 is also configured with an undulating structure 230. In this case, in contrast to the variant of FIGS. 4A and 4B, however, the undulating structure 230 is defined by a bead 237 running in a meandering manner continuously in the central sill region of the sill flange F.

The meandering path of the bead 237, also in the variant of FIG. 5, both in longitudinal section and in side view results in an undulating contour, respectively an undulating path. Along the longitudinal extension direction L successive upper partial regions 237a of the continuous bead 237 alternate with interposed intermediate regions 235—and trapezoidal in side view here—whilst at the same time lower partial regions 237b of the continuous bead 237 offset thereto alternate with non-protruding intermediate regions 236.

An undulating structure 230 on the flange section 23 of the door module 2, for example corresponding to FIGS. 4A-4B and 5, may also be provided in a door shell construction T corresponding to the variant of FIGS. 1 to 3C, since a uniform wall thickness over the sill flange F, with at the same time an improvement in the stiffness of the sill region, may be implemented in a simple manner thereby.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1, 1* Door inner skin (1st shell component)
10A, 10B, 10* Flange section
1A Frame section near A-pillar
1B Frame section near B-pillar
2 Door module (module component)
20 Support surface
21 Reinforcing and interface structure
22 Module edge
23 Flange section
230 Undulating structure
231-234 Bead (contact region)
235, 236 Intermediate region
237 Bead (contact region)
237a, 237b Partial region
23A, 23B End region
3, 3* Frame reinforcement (2nd shell component)
33, 33A, 33B Flange section
40 Gap
41 Surface contact
5 Channel seal
50 Outer seal
500 Fastening section
51 Inner seal
52 Positioning section
d Wall thickness
F Sill flange
L Longitudinal extension direction
O Window opening
T Door shell construction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A module assembly for use in a vehicle, the module assembly comprising:
a shell construction defining a window opening provided with a sill region and
a module component fixed to the shell construction and forming at least a portion of a sill flange extending along a longitudinal direction and configured to attach to a seal disposed in the sill region,
wherein the shell construction and/or the module component includes a first flange section extending along the longitudinal extension direction and forming the sill flange, wherein the first flange section includes a contact region protruding in a direction transverse with respect to the longitudinal extension direction, wherein the shell construction includes the first flange section and the module component includes a second flange section, wherein the first flange section and the second flange section abut each other to form the sill flange, and the contact region protrudes towards the second flange section, and wherein at least two protruding contact regions, spaced apart from one another, are provided along a width of the sill flange and extend along the longitudinal direction, or two partial regions, spaced apart from one another of a protruding contact region of the at least two protruding contact regions are provided along a width of the sill flange and extend along the longitudinal extension direction, and wherein a non-protruding intermediate region is disposed between the at least two protruding contact regions or between the two partial regions.

2. The module assembly of claim 1, wherein the shell construction includes a first shell component provided with the first flange section and a second shell component provided with a third flange section wherein the first flange section and the third flange section form the sill flange and the first flange section, the second flange section, and the third flange section abut each other.

3. The module assembly of claim 2, wherein in at least one region of the sill flange, the first, second and third flange sections abut each other, and in at least one other region of the sill flange, only two of the first, second and third flange sections abut each other.

4. The module assembly of claim 3, wherein at least one protruding contact region is provided in the at least one other region of the sill flange.

5. The module assembly of claim 2, wherein the first shell component forms a frame for the window opening and the second shell component includes a frame reinforcement configured to reinforce the frame.

6. The module assembly of claim 4, wherein the at least one protruding contact region is formed by a bead disposed on the second flange section or the third flange section.

7. The module assembly of claim 6, wherein the at least one protruding contact region is formed by a rib formed on the second flange section or the third flange section.

8. The module assembly of claim 1, wherein the sill flange includes a first sill region and a second sill region, wherein the first sill region extends in a first area disposed between the at least two protruding contact regions and the second sill region extends in a second area disposed between the two partial regions, and wherein portions of the first flange section and portions of the second flange section either disposed in the first area or the second area do not abut one another.

9. The module assembly of claim 8, wherein the first and second sill regions alternate along at least a portion of the width of the sill flange, wherein in the first sill region, the second flange section abuts and either a third flange section or the first flange section by the at least one protruding contact region, and wherein in a second sill region, a gap is formed between the second flange section or the first flange section or the third flange section.

10. The module assembly of claim 9, wherein the sill flange, along the longitudinal direction, includes at least two sections disposed one above the other, wherein the at least two sections respectively include, (a) at least two protruding contact regions spaced apart from one another, or (b) at least two regions of a protruding contact region spaced apart from one another.

11. The module assembly of claim 1, wherein at least one flange section of the first, second, and third flange sections has an undulating contour in the longitudinal direction.

12. The module assembly of claim 11, wherein the undulating contour is at least partially formed by the at least one protruding contact region.

13. The module assembly of claim 11, wherein the undulating contour is formed by at least one of at least two partial sections.

14. The module assembly of claim 13, wherein the at least two partial sections includes a first partial section and a second partial section each having an undulating contour extending in the longitudinal direction and wherein a valley of the undulating contour of the first partial section opposes a peak of an undulating contour of the second partial section.

15. The module assembly of claim 1, wherein a protruding contact region extends along the longitudinal direction in a meandering manner.

16. The module assembly of claim 1, wherein the sill flange includes a central sill region, wherein the central sill region is exclusively formed by a second flange section formed by the module component.

17. The module assembly of claim 16, wherein the sill flange, along the longitudinal direction, includes at least two sections disposed one above the other, wherein the at least two sections respectively include, (a) at least two protruding contact regions spaced apart from one another, or (b) at least two regions of a protruding contact region spaced apart from one another.

18. The module assembly of claim 1, further comprising:
a seal provided with a positioning section configured to position the seal with respect to the sill flange.

19. A module assembly for use in a vehicle, the module assembly comprising:
a shell construction defining a window opening provided with a sill region and
a module component fixed to the shell construction and forming at least a portion of a sill flange extending along a longitudinal direction and configured to attach to a seal disposed in the sill region,
wherein the shell construction and/or the module component includes a first flange section extending along the longitudinal extension direction and forming the sill flange, wherein the first flange section includes a contact region protruding in a direction transverse with respect to the longitudinal extension direction, wherein the shell construction includes the first flange section and the module component includes a second flange section, wherein the first flange section and the second flange section abut each other to form the sill flange, and the contact region protrudes towards the second flange section, wherein at least one flange section of the first, and second, flange sections has an undulating contour in the longitudinal direction, wherein the undulating contour is formed by at least one of at least two partial sections, and wherein the at least two partial sections includes a first partial section and a second partial section each having an undulating contour extending in the longitudinal direction and wherein a valley of the undulating contour of the first partial section opposes a peak of an undulating contour of the second partial section.

20. A module assembly for use in a vehicle, the module assembly comprising:
a shell construction defining a window opening provided with a sill region and
a module component fixed to the shell construction and forming at least a portion of a sill flange extending along a longitudinal direction and configured to attach to a seal disposed in the sill region,
wherein the shell construction and/or the module component includes a first flange section extending along the longitudinal extension direction and forming the sill flange, wherein the first flange section includes a contact region protruding in a direction transverse with respect to the longitudinal extension direction, wherein the sill flange includes a central sill region, wherein the central sill region is exclusively formed by a second flange section formed by the module component, and wherein the sill flange, along the longitudinal direction, includes at least two sections disposed one above the other, wherein the at least two sections respectively include, (a) at least two protruding contact regions spaced apart from one another, or (b) at least two regions of a protruding contact region spaced apart from one another.

* * * * *